US012222691B2

(12) United States Patent
Osborn et al.

(10) Patent No.: US 12,222,691 B2
(45) Date of Patent: Feb. 11, 2025

(54) AUTOMATED SYSTEM CONTROL WITH DATA ANALYTICS USING DOUBLY STOCHASTIC MODEL

(71) Applicant: Smart Software, Inc., Belmont, MA (US)

(72) Inventors: Brock Estel Osborn, Huntersville, NC (US); Thomas Reed Willemain, Niskayuna, NY (US); Nelson Seth Hartunian, Belmont, MA (US)

(73) Assignee: Smart Software, Inc., Belmont, MA (US)

( * ) Notice: Subject to any disclaimer, the term of this patent is extended or adjusted under 35 U.S.C. 154(b) by 429 days.

(21) Appl. No.: 17/645,599

(22) Filed: Dec. 22, 2021

(65) Prior Publication Data

US 2022/0206447 A1    Jun. 30, 2022

Related U.S. Application Data

(60) Provisional application No. 63/131,439, filed on Dec. 29, 2020.

(51) Int. Cl.
*G05B 17/02*    (2006.01)
*G06Q 10/087*   (2023.01)

(52) U.S. Cl.
CPC .......... *G05B 17/02* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 11,423,118 | B2* | 8/2022 | Shah | G06F 17/16 |
| 11,580,280 | B2* | 2/2023 | Chen | G06N 7/01 |
| 2010/0042563 | A1* | 2/2010 | Livingston | G06F 18/2321 |
| | | | | 703/2 |
| 2017/0032262 | A1* | 2/2017 | Gerken | G06N 5/041 |
| 2020/0356774 | A1* | 11/2020 | Korn | H04N 7/181 |

OTHER PUBLICATIONS

Diebolt et al, "A Stochastic Em Algorithm for Approximating the Maximum Likelihood Estimate", Sep. 1994, Stanford University, pp. 3-17 (Year: 1994).*
Diebolt, Jean et al.; "Stochastic EM: method and application"; In: Gilks, W.R., Richardson, S., Spiegelhalter, D.J. (Eds.), Markov Chain Monte Carlo in Practice. Chapman & Hall, London. (Chapter 15). 1996.

* cited by examiner

*Primary Examiner* — David Earl Ogg
(74) *Attorney, Agent, or Firm* — Hoffman Warnick LLC (57) ABSTRACT

A system and method for controlling an automated process based on a time series of count data. The approach includes characterizing an observed time series of counts by modeling the underlying dynamics that give rise to the observed data, including evaluating the time series with a driver estimation process, wherein the driver estimation process identifies a model by an iterative process that includes: providing a probability model; and utilizing a combined MCMC and EM algorithm to determine a set of model parameters for the time series; outputting an estimated sequence of driver values based on the identified model; outputting a series of statistically plausible future counts, and controlling the automated process based on the estimated sequence of driver values.

9 Claims, 8 Drawing Sheets

Estimates of model parameters and their 95% confidence intervals

| | μ | σ | φ1 | φ2 |
|---|---|---|---|---|
| Upper 95% CI | -0.760 | 0.952 | 0.044 | 0.093 |
| Estimate | -0.838 | 0.879 | -0.034 | 0.015 |
| Lower 95% CI | -0.917 | 0.806 | -0.112 | -0.063 |

AUTOMATED SYSTEM CONTROL WITH DATA ANALYTICS USING DOUBLY STOCHASTIC MODEL

BACKGROUND OF THE INVENTION

Technical Field

The present invention relates to using data analytics to control an automated system, and more particularly to a system and method that uses a doubly stochastic model to characterize, simulate and/or forecast time series data to control an automated system.

Background

Automated systems generally include some process that is controlled, i.e., managed, commanded, directed, regulated, etc., based on analysis and processing of captured data. Technologies in which automated systems are commonly utilized include, e.g., machine-based control systems, autonomous vehicles, robots, Internet of Things (IoT) platforms, computer network management, cloud computing, artificial intelligence and machine learning platforms, supply chain management, inventory control, warning systems, etc. In some cases, the captured data used to control some process involves time series data, e.g., collected from a sensor or other input device. A time series is a sequence of observations on some variable of practical interest, e.g., temperature, motion, color, speed, CPU usage, memory register count data, etc. In some cases, the automated system adjusts a behavior of some process based on expected future values of the time series. For example, if the recorded CPU usage of a cloud computing system starts trending in a certain direction, the system might reallocate resources based on predicted future needs.

SUMMARY OF THE INVENTION

A system and method are presented for characterizing, estimating, simulating and/or forecasting time series of counts, which can be utilized to control, manage, or implement an automated process.

Aspects of the invention include: a process to calculate a driver that characterize an observed time series by modeling the underlying forces (i.e., the "driver") that give rise to the observed data; a process to estimate the parameters of a probability model for the driver; a process to estimate the model and any influences attributable to exogenous variables; and a process to use the estimated model to create scenarios comprising realistic future values from the underlying data generating process, and utilize the created scenarios to control an automated process.

A further aspect of the invention includes: a system for controlling an automated process, comprising: a memory; and a processor coupled to the memory and configured to perform a process that includes: obtaining a time series of data; evaluating the time series with a driver estimation process, wherein the driver estimation process estimates a driver for the time series with an iterative process that includes: providing a model space; and utilizing an Expectation/Maximization (EM) algorithm and a Markov Chain Monte Carlo (MCMC) algorithm to determine a probability model having a set of model parameters within the model space; and generating an estimated sequence of driver values based on the model parameters, wherein the estimated sequence of driver values forms the driver; and controlling the automated process based on the driver.

An additional aspect of the invention includes a method for controlling an automated process, comprising: obtaining a time series of data; evaluating the time series with a driver estimation process, wherein the driver estimation process estimates a driver for the time series with an iterative process that includes utilizing an Expectation/Maximization (EM) algorithm and a Markov Chain Monte Carlo (MCMC) algorithm to determine a probability model having set of model parameters within a model space; generating an estimated sequence of driver values based on the model parameters, wherein the estimated sequence of driver values forms the driver; and controlling the automated process based on the driver.

A further aspect of the invention includes a tipping and cueing system, comprising: a surveillance system having a plurality of sensor units, wherein each sensor unit includes: a sensor configured to collect data from a sector within a target space; a memory configured to store count data collected from the sensor as a time series; and a processor configured to evaluate the time series with a driver estimation process, wherein the driver estimation process estimates a driver for the time series with an iterative process that includes: utilizing an Expectation/Maximization (EM) algorithm and a Markov Chain Monte Carlo (MCMC) algorithm to determine a probability model having set of model parameters within a model space; generating an estimated sequence of driver values based on the model parameters, wherein the estimated sequence of driver values forms the driver; and processing the driver to determine whether an alert condition exists for the sector.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION

A system and method are presented for controlling an automated process by analyzing (e.g., characterizing, estimating, simulating, forecasting, etc.) time series data. One of the technical challenges of using time series data is that, in some cases, time series data lacks meaningful structure on which standard analytic techniques can be applied. For example, the observed values in a time series data may be intermittent, i.e., may have many zero values with a few random nonzero values mixed in. For example, sensors that take hourly geologic measurements to evaluate earthquake potential and issue alerts over the course of a year will typically have many zero readings and occasional non-zero readings. In such cases, using the observed time series data to control an automated process lacks practical efficacy. Classical methods of time series analysis do not accommodate the integrality and intermittency of many such series of practical interest. Instead, classical methods usually assume that the data are continuous and have a Normal (Gaussian) distribution.

The present disclosure addresses this technical challenge by utilizing a doubly stochastic model that provides a pair of time series. One member of the pair is the observable time series data. The other member of the pair is an unobserved time series that underlies and "drives" the observed series. The doubly stochastic processes of interest here accordingly allow for analysis of data that does not conform to classical assumptions. Using a doubly stochastic model to analyze and process time series data to control an automated process provides a technical solution to the noted problem.

Figure 1:
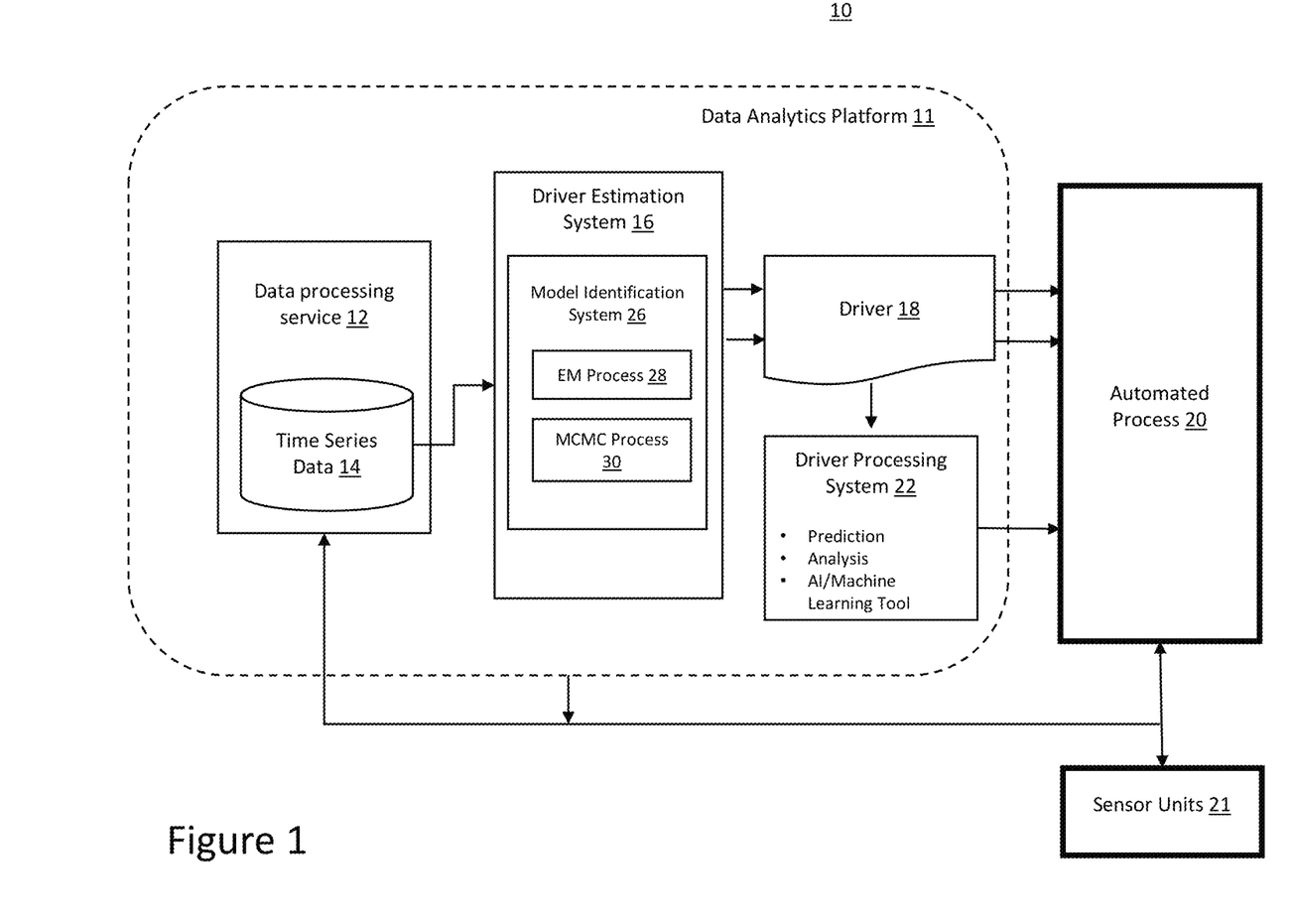
FIG. 1 depicts an automated system, in accordance with an embodiment of the present invention.

FIG. 1 depicts an automated system 10 that includes a data analytics platform 11 to estimate a driver 18 from a set of times series data 14, which can then be used to control an automated process 20. In this case, time series data 14 is collected by a data processing service 12 and is fed into a driver estimation system 16. In certain approaches, driver estimation system 16 includes a model identification 26 that deploys an iterative process (described in further detail herein) that includes an Expectation/Maximization (EM) algorithm 28 and a Markov Chain Monte Carlo (MCMC) algorithm 30 to estimate the driver 18. In certain embodiments, the driver 18 can be input directly to the automated process 20, or can be inputted first to a driver processing system 22 that, e.g., generates future scenarios, predicts future time series, visually displays the driver 18, interprets the driver 18 using AI/machine learning, etc.

In various embodiments, time series data 14 can be generated by the data analytics system 10 itself, the automated process 20, sensor units 21, and/or be obtained from any other relevant data source (e.g., a database, a software program, etc.). As noted, the automated process 20 may involve any automated technology, e.g., a machine-based control system, an autonomous vehicle, a robot, an IoT platform, a computer network, a cloud computing platform, an artificial intelligence and machine learning platform, a supply chain management system, an inventory control system, a warning system, etc. In some cases, the automated process 20 includes or interfaces with one or more sensor units 21 to collect time series data, e.g., count data. Sensor units 21 may include any technology that senses a condition and outputs a signal (e.g., a value) associated with the condition. Illustrative sensor units 21 for example include proximity sensors, temperature sensors, accelerometers, infrared sensors, pressure sensors, light sensors, optical sensors, smoke sensors, etc. Sensor units 21 may include electromechanical devices such as computer keyboards and mouse inputs. In other cases, sensor units may include electronic or optical interfaces to computing systems (e.g., a PCI board, an application programming interface (API), etc.) that sense electrical information from an input device and store information in computer memory.

Doubly Stochastic Models

There are models within probability theory that are appropriate for doubly stochastic time series. One model is the Cox process, which posits that the observed counts are samples from a Poisson process, albeit one with an intensity or average value that itself varies as a random process. One version of a Cox process relevant to practice is the Log-Gaussian Cox Process (LGCP), in which the logarithm of the Poisson parameter is itself an unobserved Gaussian time series. In various embodiments, an LGCP model is utilized to estimate the driver of a time series.

Some of the present embodiments deploy a complex and informative structure to the logarithm of the Poisson parameter. In various such approaches, the LGCP model includes a $p^{th}$ order autoregressive AR(p) model, or a seasonal autoregressive or SAR(p) model, the latter being a special case of a periodic process. For instance, if the data are daily observations, one day's observations could be influenced by both the previous day's observation and the same day's observation one week earlier.

The estimation of a sequence of driver values from a series of observed counts is however a non-trivial problem. This is especially true when the counts are intermittent, because a count of zero is not highly informative, being more or less consistent with an infinite range of Poisson parameters from a bit above zero down to negative infinity.

The statistical literature in this area is heavily weighted toward a related but distinct problem: Random spatial processes such as the location of rogue ocean waves, birds' nests, certain types of trees, and stars in the heavens. The literature on the LGCP and close relatives is sparser in the area of this invention, which involves time series.

Among prior work focused on time series, variants of the Cox process have been applied, e.g., to monthly warranty claims for end-of-life electronic devices, insurance claims, monitoring of the health of elderly people using data from smart electric meters, coal-mining disasters, and stock price movements. Various deficiencies however limit the utility of these approaches for the objectives of the present embodiments, including specialization to products in end-of-life conditions, assumption of continuous rather than discrete time data, and especially model specifications that do not permit generative uses, such as creation of future count scenarios.

Figure 2:
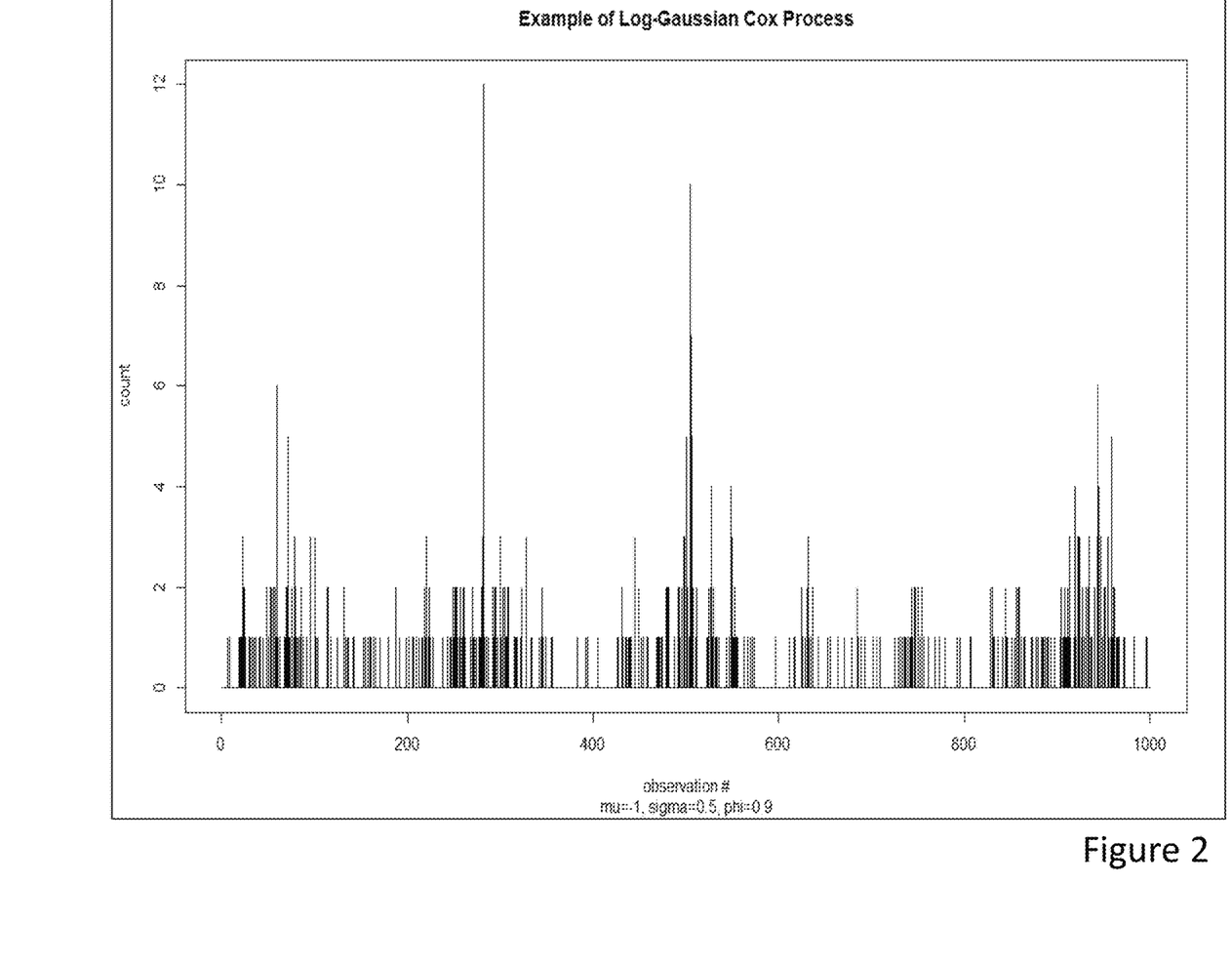
FIG. 2 depicts an example of a time series of intermittent count data generated by a Log-Gaussian Cox Process (LGCP) in accordance with an embodiment of the invention.

FIGS. 2-5 provide an illustrative overview for estimating and/or utilizing a driver 18. FIG. 2 depicts an example of a time series of intermittent counts generated by a Log-Gaussian Cox Process. As shown, the data is both intermittent and highly variable, which is typical of many time series of interest that cannot be analyzed using classical approaches.

Figure 3:
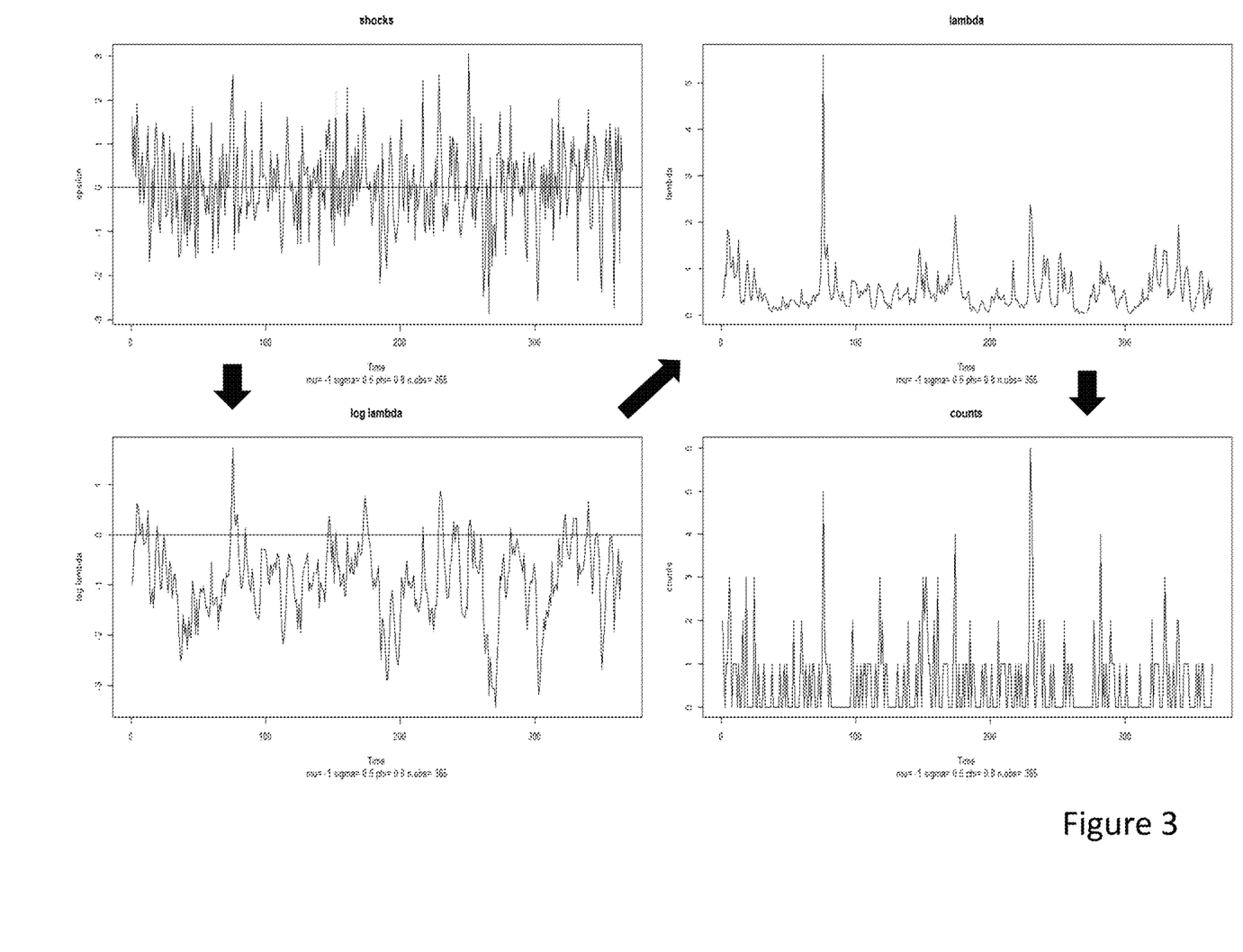
FIG. 3 depicts the construction of a Log-Gaussian Cox Process in accordance with an embodiment of the invention.

FIG. 3 depicts the steps underlying a Log-Gaussian Cox Process used to model the generation of the observed counts. In the top left panel, a sequence of random "shock" values characterized as Gaussian white noise begins the process. In the bottom left panel, an autoregressive AR(1) model (i.e., driver) shapes the shocks into a sequence of values of the logarithm of the Poisson intensity (log lambda). In the top right panel, exponentiation of this sequence produces a random sequence of Poisson intensities in each time period (lambda). Finally, in the bottom right panel, a Poisson process with the given intensities produces the observed counts.

Figure 4:
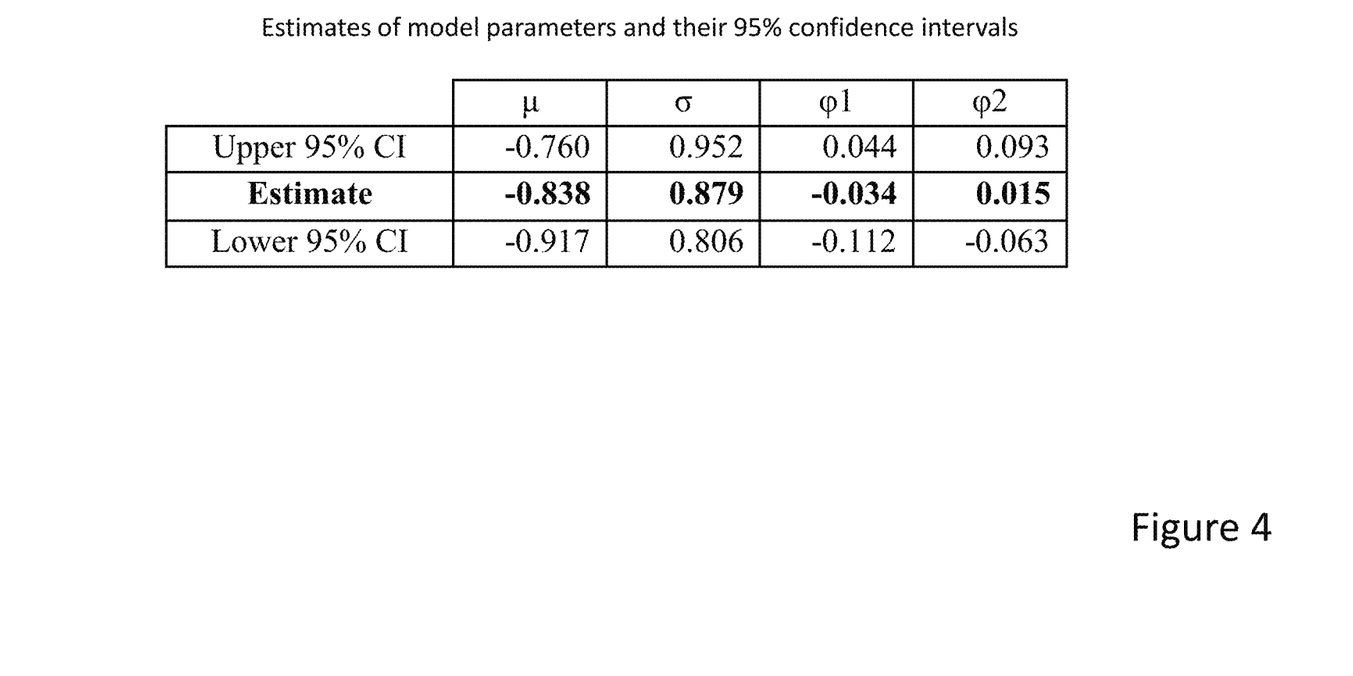
FIG. 4 depicts estimates of the process parameters and their uncertainties in accordance with an embodiment of the invention.

The general form for an AR(p) model space (also referred to herein as an AR(p) LGCP model) may be given by:

$$\log(\lambda_t) = \sum_{k=1}^{p} \varphi_k \log(\lambda_{t-k}) + \left(1 - \sum_{k=1}^{p} \varphi_k\right)\mu + \sigma\varepsilon_t$$

where the $\varphi_k$ parameters may be unknown constants or functions of other variables containing unknown parameters. FIG. 4 depicts typical outputs from driver estimation system (16 in FIG. 1) in which an AR(2) model within the model space was used, and which may be given by:

$\log(\lambda_t) = \mu \cdot (1-\varphi_1-\varphi_2) + \varphi_1 \cdot \log(\lambda_{t-1}) + \varphi_2 \cdot \log(\lambda_{t-2}) + \sigma\cdot\varepsilon_t, \varepsilon_t \sim$ i.i.d. $N(0,1)$ In this case, there are both point estimates ("most likely" values) and 95% confidence intervals for the four model parameters ($\mu$, $\sigma$, $\varphi_1$ and $\varphi_2$) computed from a sample of 1,000 observations. These results show that both the autoregressive parameters, $\varphi_1$ and $\varphi_2$, are statistically indistinguishable from zero. Accordingly, it is known that the driver, $\log(\lambda_t)$, is simple white noise without any "memory" linking past counts to present counts. We can use this model to then generate scenarios of future observations, and these scenarios can be input to models of larger systems to either guide their design or stress-test a proposed design. Note that while the use of an AR(p) LGCP model is described herein to estimate the driver, it is understood that other LGCP models could likewise be utilized, and fall within the scope of the invention.

Figure 5:
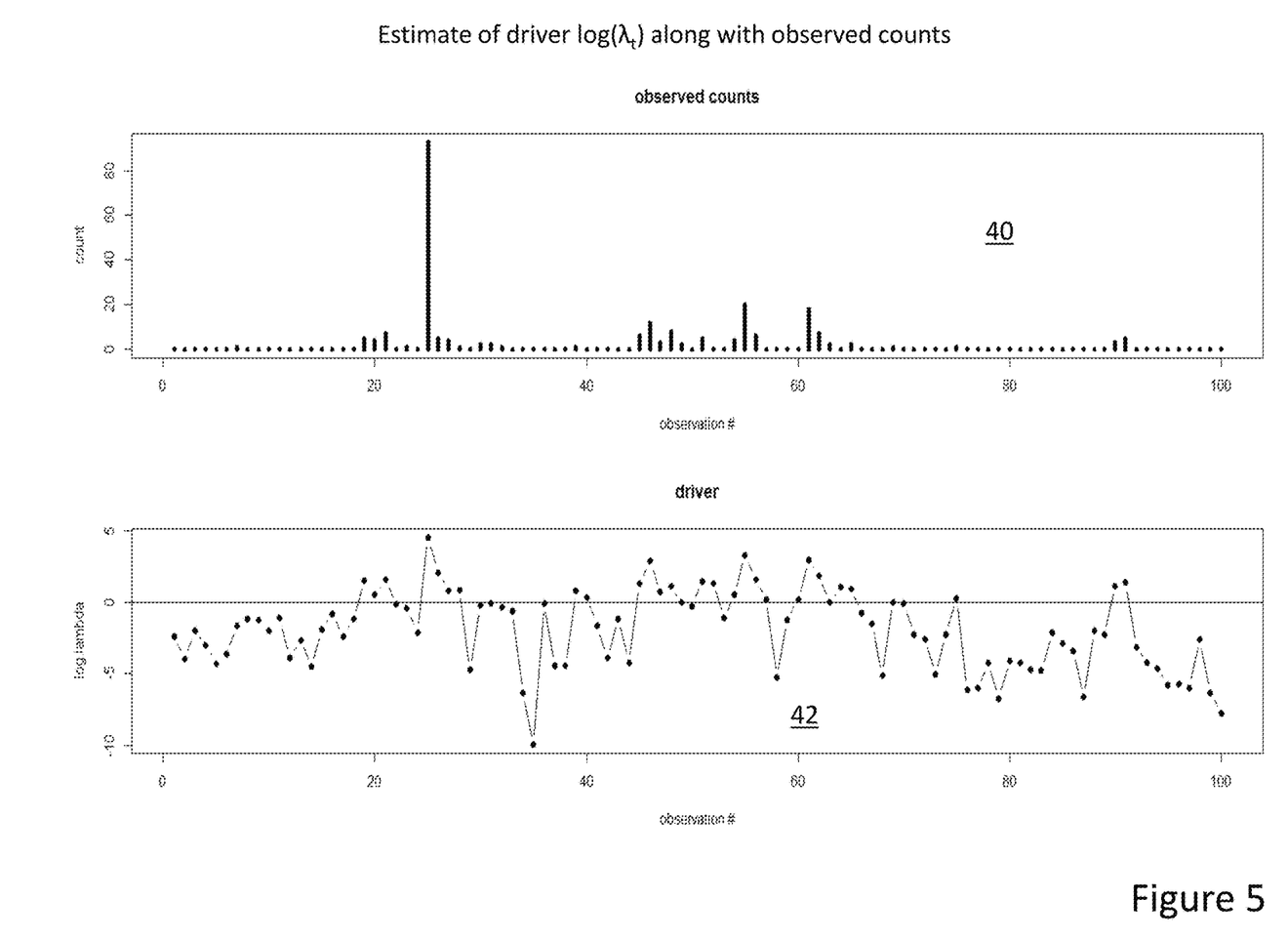
FIG. 5 depicts an illustrative output of the invention in accordance with an embodiment of the invention.

FIG. 5 depicts both observed counts 40 and the inferred values of the driver 42. (Not shown are confidence intervals around each inferred value.) The driver 42 could for example be further processed, used to control an automated process, or analyzed by subject matter experts to understand the forces behind the observed counts.

Figure 6:
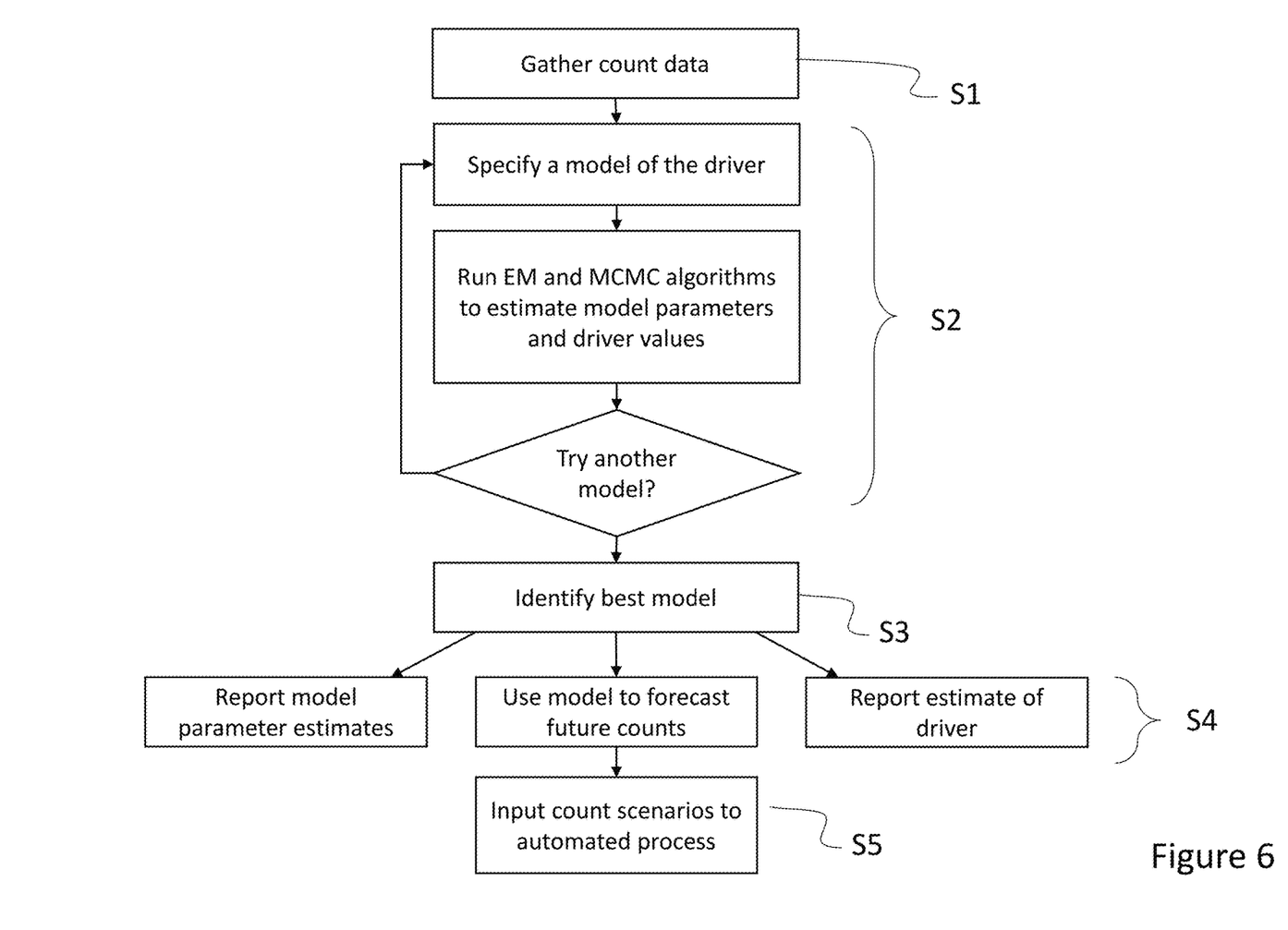
FIG. 6 depicts a flow diagram of the proposed process for analyzing observed count data in accordance with an embodiment of the invention.

FIG. 6 depicts a flow diagram of the proposed process for analyzing the count data to estimate a driver. At S1, count data is gathered for a time series, then an iterative process S2 searches the model space to find the model that fits the counts best in the sense of maximum likelihood. This process utilizes estimation using a combination of the Markov Chain Monte Carlo (MCMC) and Expectation/Maximization (EM) algorithms (the combination of which is commonly referred to as "Stochastic EM"). When the best model (e.g., the simplest model that achieves the necessary confidence) has been identified at S3, the results of the model can be reported at S4, e.g., the outputs may include the estimated parameter values and their 95% confidence intervals and/or the estimated driver values and their 95% confidence intervals at each time period. Alternatively, the best model as estimated (i.e., the driver) can also be used to generate, i.e., forecast, an unlimited number of scenarios of future count values. These scenarios or the driver itself can then be input to an automated process at S5.

The iterative process at S2 involves choice of a class of probability models capable of generating data statistically similar to that observed from the model space. In one embodiment, this would involve choice of an autoregressive model of order up to some limit, such as an autoregressive process with two lags. Such a model accommodates complex data dynamics. This process can be automated by estimating all selected models and then identifying which fits the data best based on the statistical significance of the estimated AR coefficients. For instance, if the AR(1) coefficient is significant but the AR(2) coefficient is not, then the process would automatically select the AR(1) LGCP for use. More generally, the driver could be characterized using Box-Jenkins models of the SARIMA type, thus accommodating multiple degrees of system "memory" as well as trend and seasonality phenomena.

Processes to estimate the parameters of the probability model and the driver can be executed together in an alternating sequence using an advanced data analysis algorithm which combines Expectation/Maximization (EM) with Markov Chain Monte Carlo (MCMC), i.e., Stochastic EM. An AR(p) LGCP applied to N observations must estimate N+2+p parameters. To do so, the approach uses the EM algorithm to cycle between estimating the model parameters and estimating the driver. To estimate the driver, the approach uses the latest estimates of the model parameters to create an estimated sequence of driver values. The suitability of a proposed estimate of driver values is assessed using maximum likelihood methods taking account of both the likelihood of a given shock and the likelihood of a given observed count conditional on the estimate of the driver. This iterative process continues until the MCMC and EM algorithms converge to numerically stable estimates. In one approach, repeating this process many times and averaging the results provides final parameter estimates as well as estimates of parameter uncertainty.

Given the choice of model and estimates of that model's parameters, the process can automatically generate any specified number of synthetic count series that are statistically similar but not identical to the original observed series as shown in FIG. 3. Using this approach, the data analytics system is a "scenario generating machine."

As is evident, there are numerous practical uses of this approach. For example:

Description: Given a probability model of the underlying process, it is possible to estimate model parameters that characterize the driver of the counts. These estimates could then be used, for example, to understand how the driver changes over time. For instance, an AR(1) model is characterized by three parameters: a mean, a variance, and an autocorrelation. Deducing from the observed counts in two different periods how each of the three parameters changes over time may provide early warning of impending trouble or provide reason to adjust the settings on automatic systems.

Prediction of counts: Given an accurately estimated LGCP model, one could use that model to generate predictions of future values of the observed counts. These scenarios could be used to estimate, for instance, the probability and timing of dangerously large values of either single period counts or cumulative counts. The scenarios could also be used to span the range of potential future sets of counts as a way to realistically stress-test models of future systems to make their designs more robust.

Estimation of the driver: Estimates of past values of the driver may be of greatest interest to those looking to reconstruct the underlying dynamics of a process of interest. For instance, knowing when the driver was higher or lower than average would be useful for hypothesis generation. This information may be more clearly seen in the estimated time series of driver values than in the observed counts because the latter are noisy observations of the former.

Prediction of the driver: In some cases, the most useful predictions would be those of the underlying driver, since those may be the core scientific or engineering information needed to understand the random phenomenon observed as a series of random counts.

Causal modeling: It is possible to extend the Cox Process model to include the effect of exogenous ("external") variables. For instance, the market process generating demand for spare parts may be influenced by the time-in-service of the apparatus whose parts may need replacement. Or the count of significant wildfires in an area may be influenced by the average moisture content of vegetation in an area. Likewise, a time index and a day-of-week indicator can be represented in the invention to broaden the scope of data that can be modeled to include both trend and daily seasonality.

As also noted, there are any number of technologies to which the described data analytics could apply. For instance, in the realm of sensors and IoT platforms, there exist technologies used for "automated tipping and cueing." Tip and cue refer to the process of monitoring an object of interest by a sensor and requesting ("tipping") another more powerful sensor platform to acquire ("cueing") more detailed information. In this technology, the driver could be used to identify which of many simple sensor signals carries "interesting" data and then direct a higher-powered system to focus additional computation on the "tipped" signals.

Figure 7:
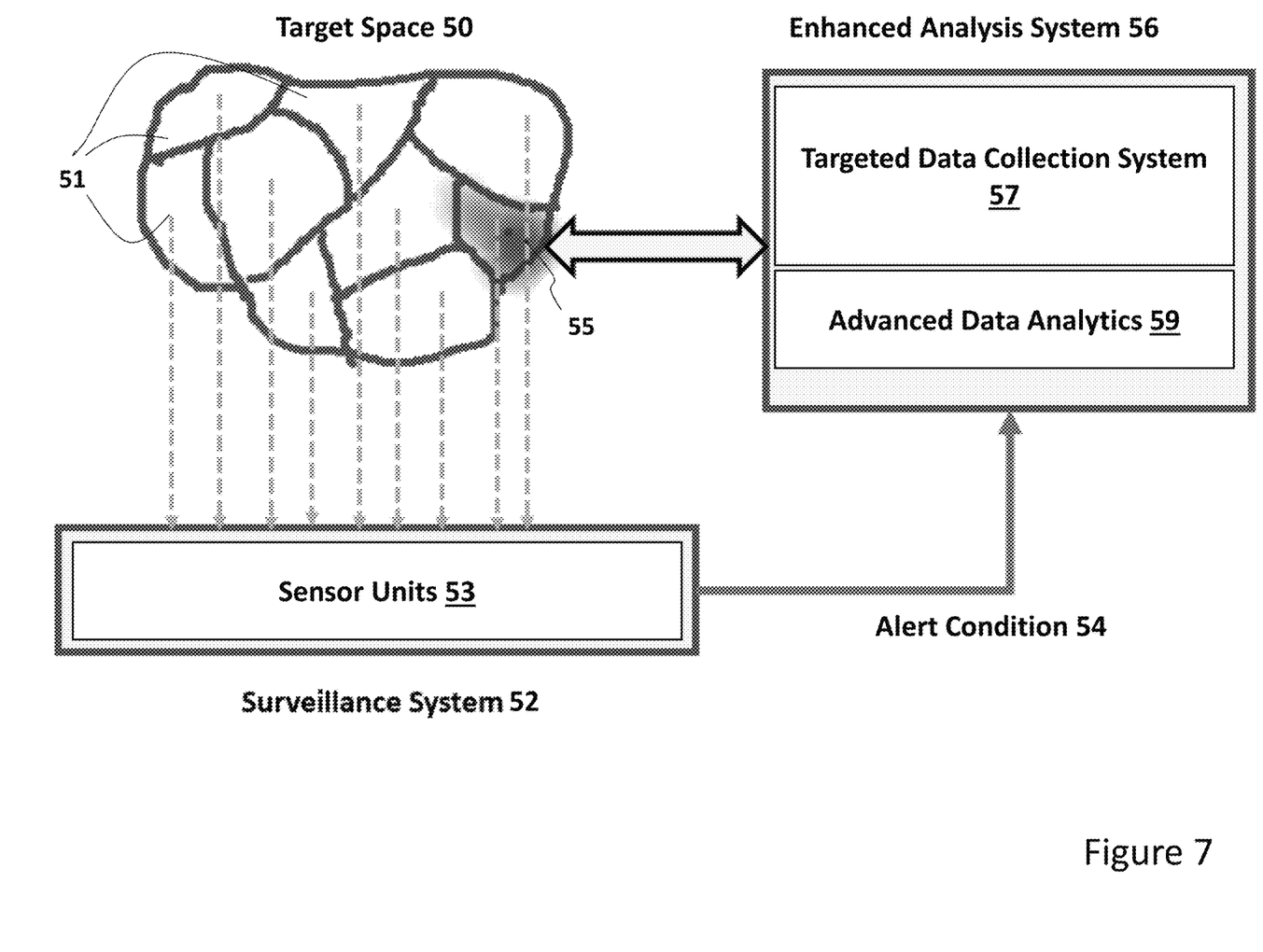
FIG. 7 depicts a system for automated tipping and cueing in accordance with an embodiment of the invention.

FIG. 7 depicts an illustrative tipping and cueing system designed to monitor sectors 51 within a target space 50. Target space 50 may for example include a geographic region, a computer network, collected image data, a set of autonomous vehicles, a set of robots, an Internet of Things (IoT) platform, a supply chain management system, an inventory, etc. The overall system includes: (1) a surveillance system 52 having multiple sensor units 53, e.g., simple sensors each having a lightweight processing unit and communication system; and (2) an enhanced analysis system 56 that receives alert conditions 54 from one or more sensor units 53 and is configured to perform more advanced monitoring of associated sectors 51. Sensor units 53 monitoring each of the sectors 51 record events of interest (i.e., counts) and the counts are processed to estimate the driver in each sector 51. Depending on the implementation, the processing can be done, e.g., by the individual sensor units 53, by a dedicated processor implemented with the surveillance system 52, by a remote server such as a cloud, etc. If driver results from any of the sensor units 53 suggest operational significance either at that moment or in the future (e.g., as shown by the shaded sector 55), the surveillance system 52 generates an alert condition 54 to the more capable enhanced analysis system 56. Enhanced analysis system 56 can then deploy a targeted data collection system 57 on the potentially significant sector 55 to obtain more complex data for processing using advanced data analytics 59.

In the realm of tipping and cueing, the counts might be obtained from any number or type of sensor units 53 for any purpose. For example, sectors 51 might include geographic zones being monitored for seismic activity (e.g., in which activity over a certain level triggers a count), IP addresses known to be used by bad actors (e.g., in which traffic over a threshold triggers a count), etc. As noted, a lightweight, low-cost sensor unit 53 can be assigned to each sector 51 of the target system 50 (e.g., "hot zones" in the seismic example or blacklists of IP addresses in the malware example). Each sensor unit 53 collects a time series of information, e.g., a weekly count of earth tremors above a certain size or an hourly count of packets transmitted to/from a suspect IP address.

Each sensor unit's time series can be fed into a simple paired processor for driver generation and analysis, e.g., on a rolling basis, periodically, etc. The processors may be limited in capacity and may have other restrictions, such as being powered by batteries with limited life. A lightweight data analytics system can reside on each processor and determine whether something "interesting" is happening at the end of its sensor line, e.g., by analyzing the driver itself, or by forecasting future activity based on the driver. If a processor decides that the sector a sensor unit monitors is worthy of more intense scrutiny, the device can use some of its precious battery power to send a selective alert 54 to the analysis system 56. The analysis system 56 includes more advanced data collection and processing capabilities, but may be restricted in its deployment to a limited number of sectors 52—hence the need for the first-stage surveillance system 52. In the malware example, the analysis system 56 may for instance provide advanced data analytics 59 using machine learning algorithms and/or be configured to deploy a dedicated team of cyberwarriors and their associated hardware and software to evaluate the sector of interest 55.

Other tipping and cuing applications can include, e.g., using sensor units 53 to monitor a small section of the night sky, watching for and reporting flashes of a certain minimum brightness. If the sequence of flash counts leads to a forecast of further activity, as computed by the lightweight data analytics, then the system can cue a much larger and more intensive observing telescope and associated spectral analyzers to move to point to the suddenly "interesting" part of the sky to conduct a more extensive analysis.

In still other cases, sensor units 53 in an automated warehouse and/or computing system can detect demand for inventory, e.g., spare parts, in which the demand for a given part is intermittent. In this case, a time series may comprise orders recorded over a period of time, which can be evaluated by the lightweight data analytics platform to determine a driver. The resulting driver can then be used by an automated re-ordering process resident in an Enterprise Resource Planning system on a mainframe computer to plan future inventory, deploy robots in a warehouse to stock shelves in a smart manner, etc.

Tipping and cueing may also be deployed in the defense and intelligence sectors. The Defense Advanced Research and Development Agency (DARPA) experimented with small floating sensors ("the Ocean of Things") to gather information within the severe constraints imposed on "detectors at the edge"; the detectors in this case tip a central cloud-based system. Other intelligence agencies are likewise exploring similar systems (see, e.g., Dawn Meyerriecks, Deputy Director of CIA for Science and Technology, quoted in *Washington Post*, 26 Apr. 2021).

Figure 8:
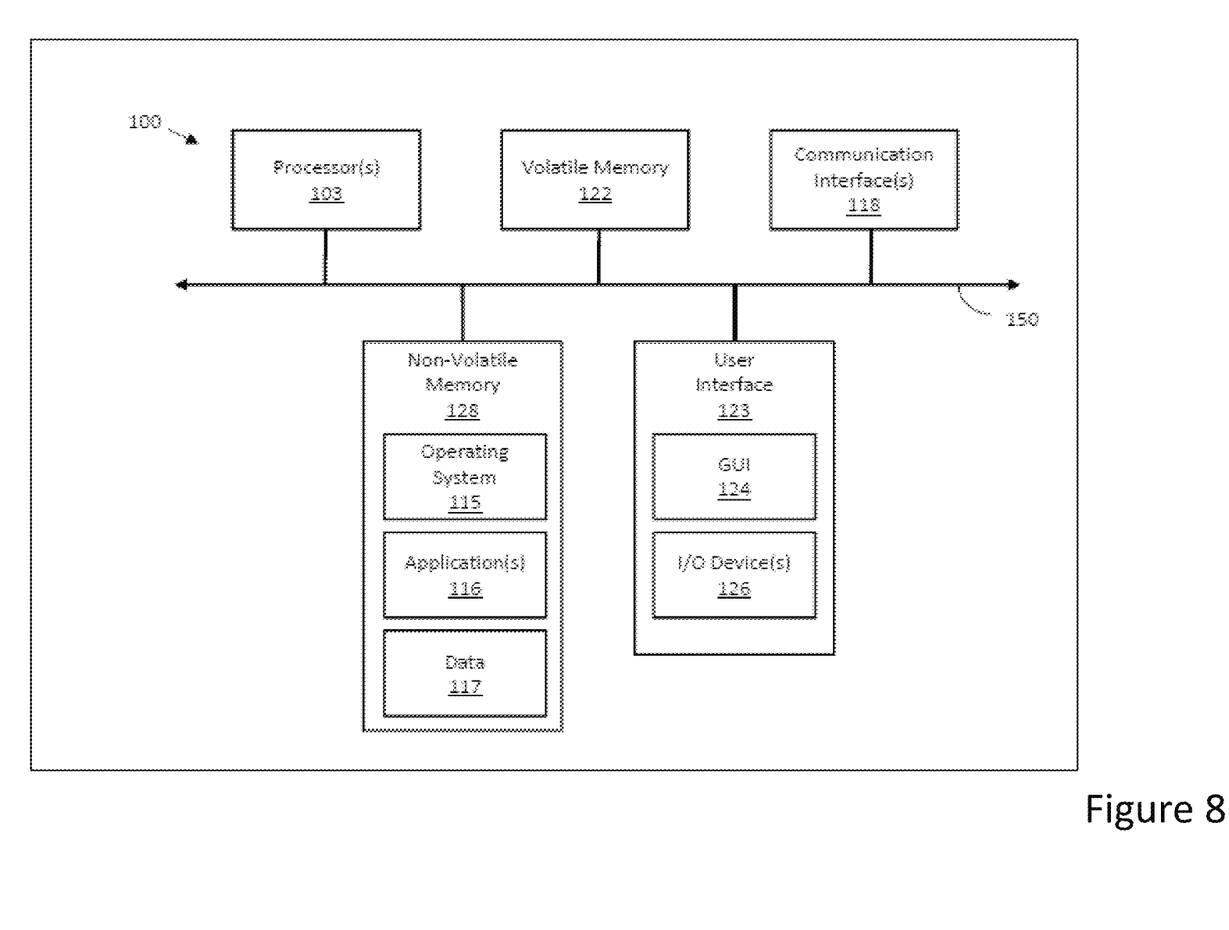
FIG. 8 depicts a computing system in accordance with an embodiment of the invention.

FIG. 8 depicts a block diagram of a computing device 100 useful for practicing an embodiment of system 10. The computing device 100 includes one or more processors 103, volatile memory 122 (e.g., random access memory (RAM)), non-volatile memory 128, user interface (UI) 123, one or more communications interfaces 118, and a communications bus 150. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute on one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

The invention claimed is:

1. A system for controlling a robot in an automated warehouse to stock shelves, comprising:
    a memory; and
    a processor coupled to the memory and configured to perform a process that includes:
        obtaining a time series of data associated with an intermittent demand for parts in the automated warehouse;
        evaluating the time series with a driver estimation process, wherein the driver estimation process estimates a driver for the time series with an iterative process that includes:
        providing a model space; and
        utilizing an Expectation/Maximization (EM) algorithm and a Markov Chain Monte Carlo (MCMC) algorithm to determine a probability model having set of model parameters within the model space; and
        generating an estimated sequence of driver values based on the model parameters, wherein the estimated sequence of driver values forms the driver; and
        processing the driver values to generate future demand scenarios; and
    controlling the automated warehouse based on the driver, including planning future inventory and deploying robots within the automated warehouse to stock shelves based on the future demand scenarios.

2. The system of claim 1, wherein the time series is obtained from a sensor unit.

3. The system of claim 2, wherein the sensor unit includes at least one of a proximity sensor, a temperature sensor, an accelerometer, an infrared sensor, a pressure sensor, a light sensor, an optical sensor, a smoke sensor, an electromechanical device, a Peripheral Component Interconnect (PCI) board, and an application programming interface.

4. The system of claim 1, wherein the intermittent demand includes mostly zeros.

5. The system of claim 1, wherein the model space comprises a Log-Gaussian Cox Process (LGCP) model.

6. A method for controlling a robot to stock shelves in a warehouse, comprising:
    obtaining a time series of intermittent data from a sensor in the warehouse;
    evaluating the time series with a driver estimation process, wherein the driver estimation process estimates a driver for the time series with an iterative process that includes utilizing an Expectation/Maximization (EM) algorithm and a Markov Chain Monte Carlo (MCMC) algorithm to determine a probability model having set of model parameters within a model space;
    generating an estimated sequence of driver values based on the model parameters, wherein the estimated sequence of driver values forms the driver;

processing the driver to generate future demand scenarios; and controlling the robot within the warehouse to stock shelves based on the future demand scenarios.

7. The method of claim 6, wherein the time series is obtained from a sensor unit.

8. The method of claim 7, wherein the sensor unit includes at least one of a proximity sensor, a temperature sensor, an accelerometer, an infrared sensor, a pressure sensor, a light sensor, an optical sensor, a smoke sensor, an electromechanical device, a Peripheral Component Interconnect (PCI) board, and an application programming interface.

9. A system for re-ordering parts in an enterprise resource planning (ERP) system, comprising:

a memory; and a processor coupled to the memory and configured to perform a process that includes:

obtaining a time series of data associated with an intermittent demand for parts in the ERP system;

evaluating the time series with a driver estimation process, wherein the driver estimation process estimates a driver for the time series with an iterative process that includes:

providing a model space;

utilizing an Expectation/Maximization (EM) algorithm and a Markov Chain Monte Carlo (MCMC) algorithm to determine a probability model having set of model parameters within the model space; and generating an estimated sequence of driver values based on the model parameters;

processing the driver values to model future demand scenarios for the parts in the ERP system that are statistically similar but not identical to time series; and automatically re-ordering parts in the ERP system based on the future demand scenarios.

* * * * *